Jan. 28, 1947.  U. F. LUEBBEN  2,414,823
PICK-UP CONVEYER
Filed Sept. 16, 1943  5 Sheets-Sheet 1
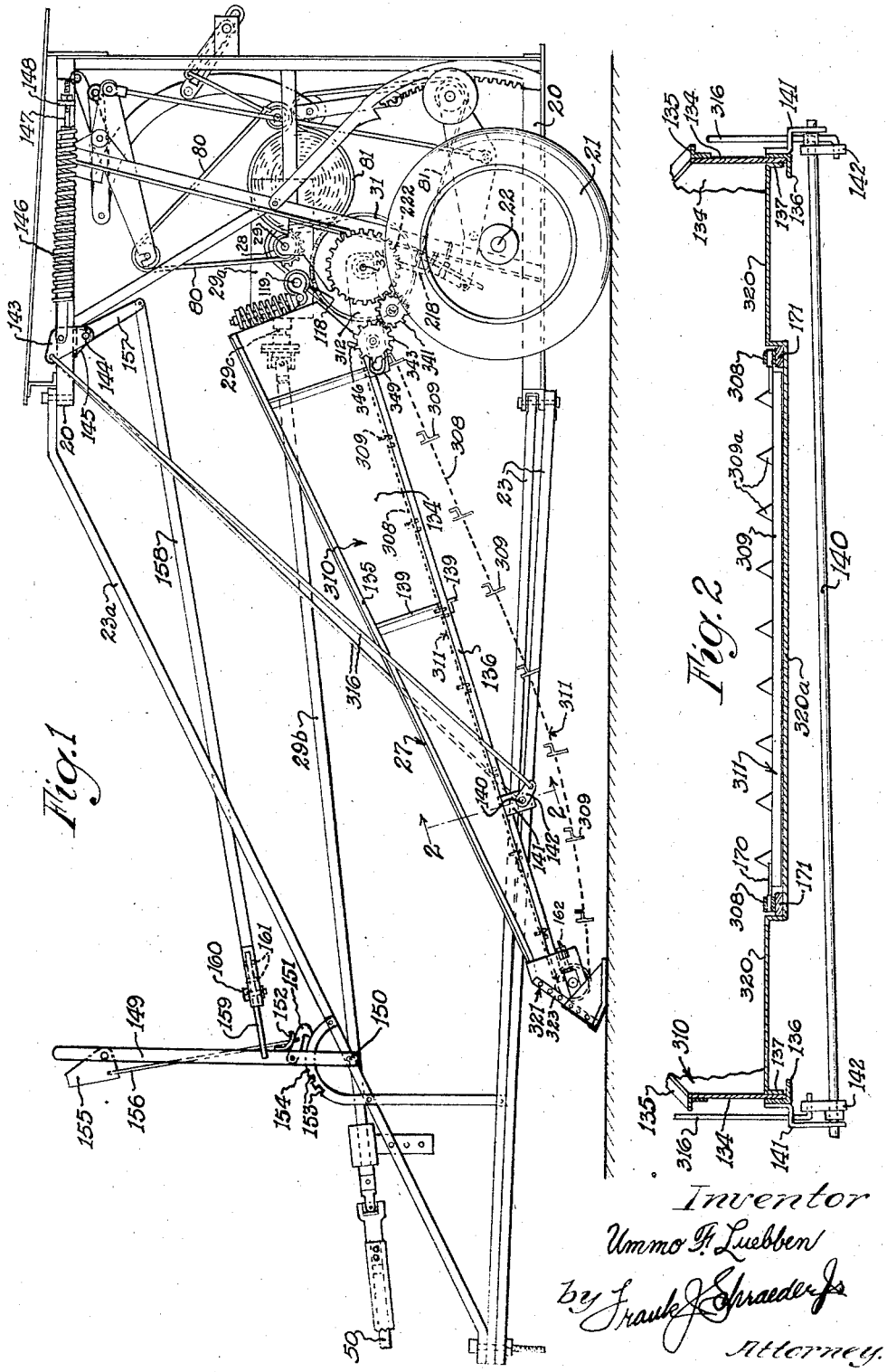
Inventor
Ummo F. Luebben
by Frank J. Schraeder Jr.
Attorney.

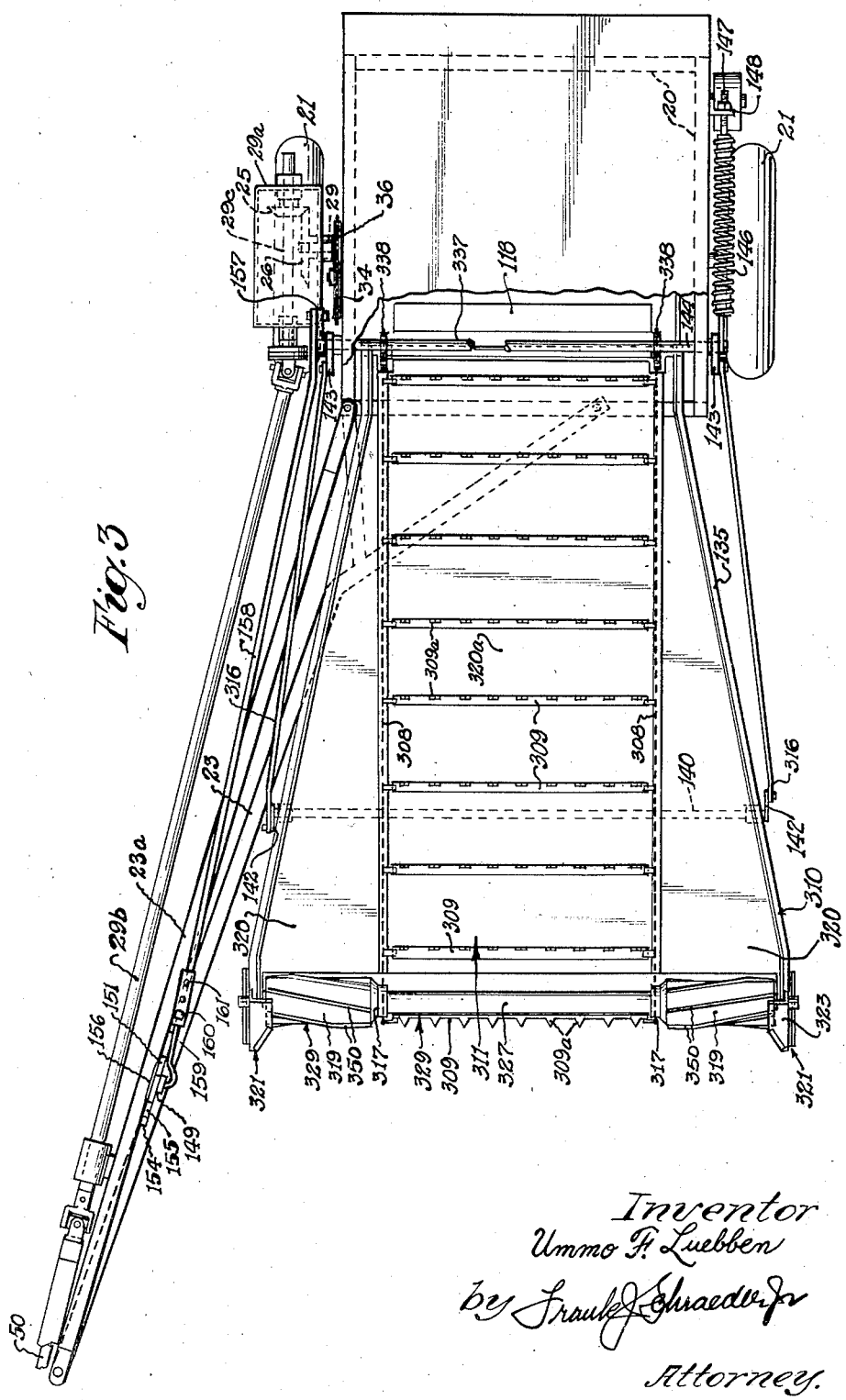

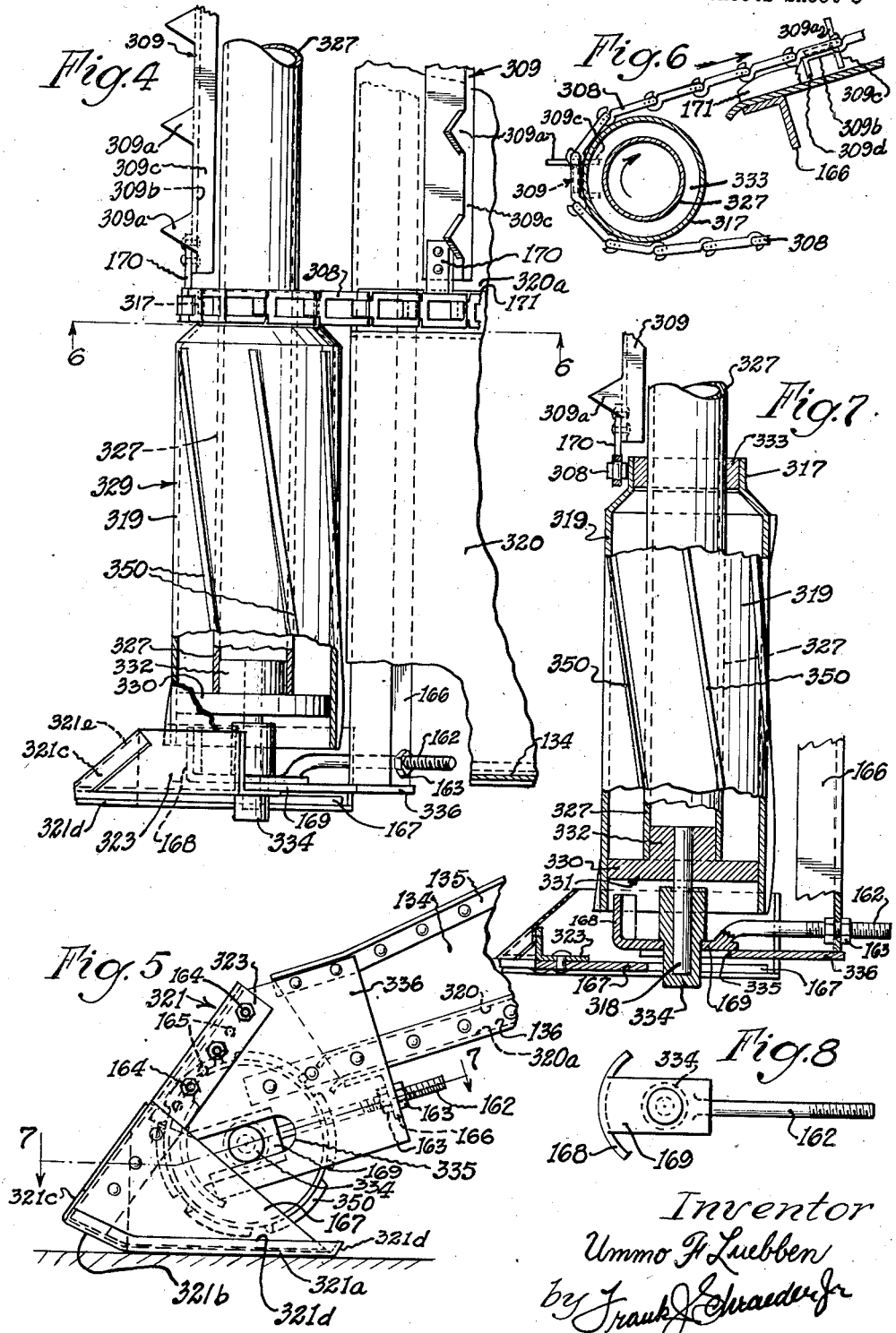

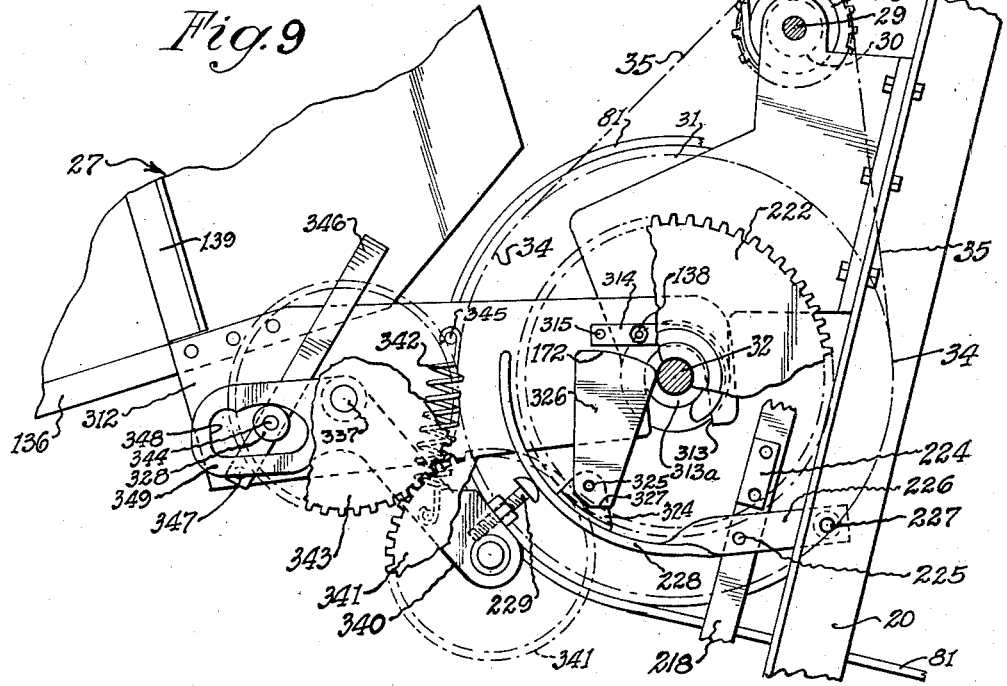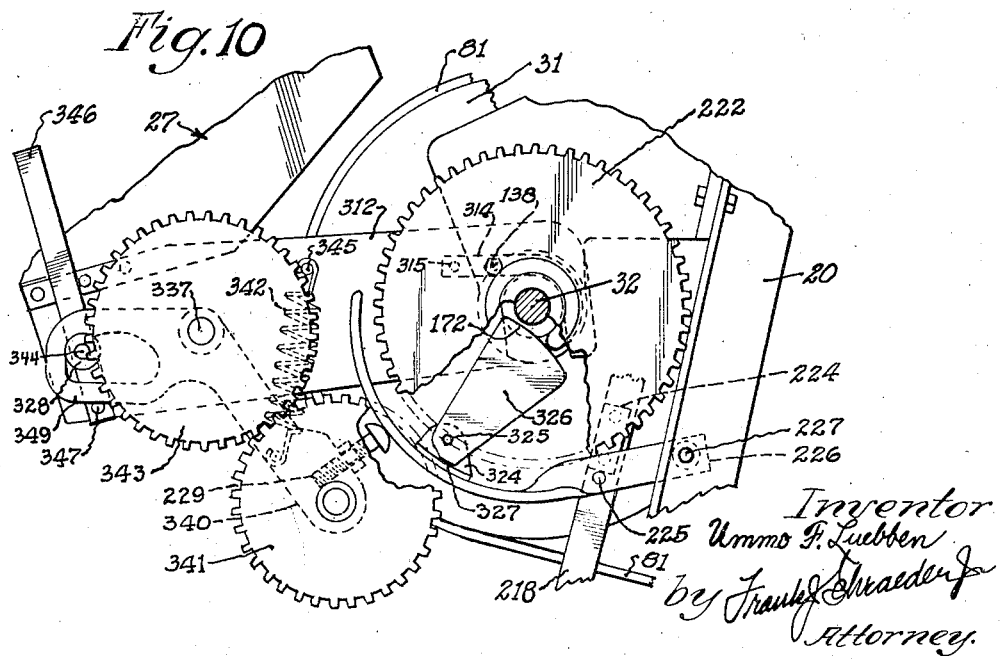

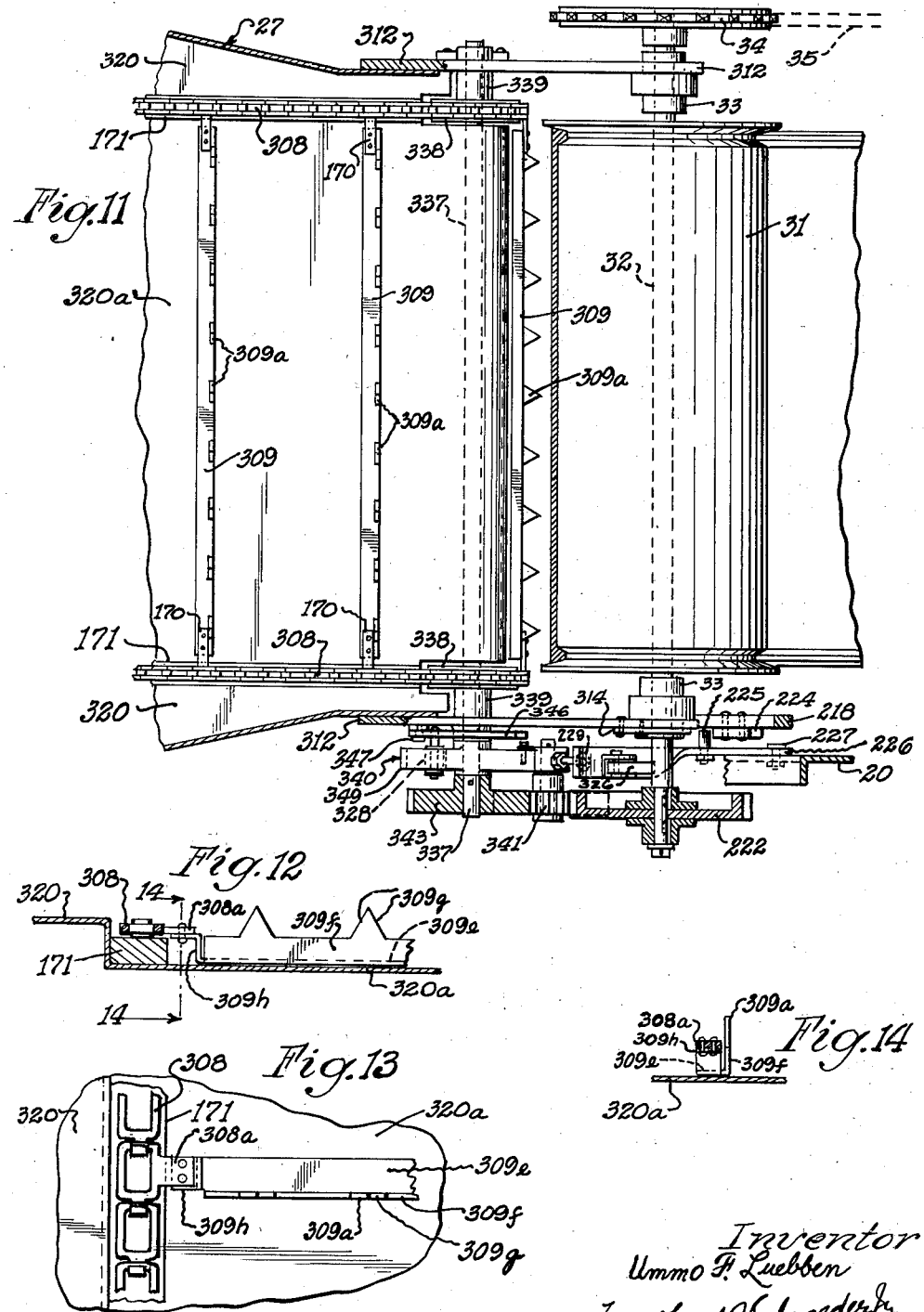

Patented Jan. 28, 1947

2,414,823

UNITED STATES PATENT OFFICE 2,414,823

PICKUP CONVEYER

Ummo F. Luebben, Omaha, Nebr.

Application September 16, 1943, Serial No. 502,701

18 Claims. (Cl. 56—364)

This invention relates generally to improvements in harvesting and the like machines or implements and has more particular relation to or utility in connection with a crop pick-up conveyer which may be employed in co-operation with various types of harvesting machines.

The invention has particular reference to an improved pick-up or feeding conveyer which is especially adapted to operate in connection with a hay baler, or other crop handling or working machine to which the pick-up conveyer may be attached; the crop handling or working machine and the pick-up conveyer being ordinarily operatively connected and adapted to be drawn across a field by a tractor whereby the pick-up conveyer functions to pick up or collect hay or other crop as from a windrow and elevate and feed the material to the machine.

The invention has among its objects to provide a feeding conveyer embodying novel improvements in details of construction of the members and parts thereof and in the driving mechanism therefor tending to increase the efficiency of the conveyer as a portable crop pick-up or collecting feeder or as a stationary feeder for the machines to which it may be operatively connected.

One of the objects of the invention is to provide a pick-up conveyer having a forwardly flared receiving trough which is wider at its receiving end than the crop-conveying or crop-moving means preferably in the form of an endless web movable thereon and wider than the discharge end of the trough, and which flared receiving trough end is provided with a novel rotary pick-up or collecting device having pick-up or collecting elements of improved design at the flared lateral portions of the trough which extend outwardly laterally beyond the sides of movable conveyer web and impel the crop upwardly and rearwardly onto the forward end of the trough.

Another object of the invention is found in the provision, on the end portions of the pick-up device, of feed roller pick-up drums provided with a plurality of circumferentially spaced longitudinally extending ribs or cleats which cooperate with the conveyer web to facilitate the feeding of the material to the conveyer web and onto the conveyer trough.

Another improved feature of my invention resides in the spiral arrangement of said ribs or cleats, that is, their angular positioning relatively to the axis of the feed roller drum and their relatively opposite grouping on the two drums whereby the material engaged by such spirally-cleated drums will tend to be moved onto the lateral flared side extensions of the conveyer trough in directions converging toward the center of the conveyer to thereby facilitate the movement and feeding of the material onto the trough in cooperation with the conveyer web.

Another object of the invention resides in the provision of a conveyer web composed of a pair of spaced flexible endless members, such as chains, transversely connected by spaced material pick-up slats or bars each having a plurality of spaced upstanding prongs which are pointed and preferably made integral with the transverse bars, the prongs on each transverse bar having flat leading faces preferably disposed perpendicularly to the trough bottom during their movement in the trough and such leading faces of the prongs of each bar being preferably plane-aligned in a plane which is perpendicular to the direction of the movement of the material on the trough.

It is also an object of my invention to preferably construct the conveyer web pick-up bars of an L-shaped cross-section or of channel or U-shape cross-section and to so mount them on the conveyer chains that, during their movement in the trough, the upstanding prongs thereof are disposed in vertical alignment with the upstanding leading leg or flange of the bar.

Still another object of the invention resides in the novel drive mechanism for manually or automatically stopping the movement of the conveyer during the operation of the machine to which the pick-up conveyer is operatively connected.

This invention is a division in part of my co-pending application for improvements in rotary balers filed December 12, 1938, under Serial No. 246,042 which issued as Patent No. 2,336,491 on December 14, 1943.

With the above and other objects in view which will become readily apparent to those skilled in the art to which this invention appertains, the invention consists in the novel combination, construction and arrangement of the members and parts shown in preferred embodiment in the attached drawings, described in the following specifications, and particularly pointed out in the appended claims.

In the attached drawings forming part of this specification, and in which like reference characters designate the same or similar parts in the several illustrations:

Fig. 1 is a side elevation of a pick-up conveyer and baler embodying my invention;

Fig. 2 is an enlarged cross-section taken on line 2—2 of Fig. 1 showing the conveyer and the conveyer-trough in cross-section with a portion of the suspension device;

Fig. 3 is a plan view of the pick-up conveyer showing a portion of the baler;

Fig. 4 is an enlarged plan view of one end of the crop-collecting or crop-impelling device showing one of the crop-impelling feed drums at one end of the feed roller and one of the supporting shoes;

Fig. 5 is an enlarged side view of the lower or feed end of the pick-up conveyer.

Fig. 6 is a cross-section taken on line 6—6 of Fig. 4;

Fig. 7 is a cross-section taken on line 7—7 of Fig. 5 showing a portion of the exterior face of one of the pick-up roller end drums;

Fig. 8 is a side view of one of the adjustable drum-end shields;

Fig. 9 is a side elevation of the conveyer drive mechanism showing the mechanism in driving position;

Fig. 10 is a side elevation of the conveyer drive mechanism showing the conveyer drive elements in operatively disengaged position;

Fig. 11 is a plan view with parts in section showing the upper or discharge end of the pick-up conveyer and the automatically and manually disengageable drive mechanism therefor;

Fig. 12 shows a side elevation of one end of a modified form of an improved conveyer pick-up bar member;

Fig. 13 is a plan view of the bar member shown in Fig. 12, and

Fig. 14 is cross-section taken on line 14—14 of Fig. 12.

The preferred embodiment of my invention shown in the accompanying drawings is illustrated for practical purposes as a pick-up conveyer for my improved hay baler which is shown and described in Patent No. 2,336,491, issued December 14, 1943, and Patent No. 2,096,990 issued to me on October 26, 1937, however, I do not wish to be understood as limiting my invention to such illustrative application or use since the invention is applicable for use in connection with various other types of harvesting implements and machines as a crop pick-up and feed device therefor.

In the accompanying drawings, the members and parts shown therein are designated by the same reference numerals as those which designate the same or similar members and parts that are shown and described in my said Patent No. 2,336,491, and only those members and parts of the baler and its mechanism are herein described and particularly referred to which are directly operatively related to the construction or operation of the pick-up conveyer.

As shown in the drawings, the baler includes frame members generally designated by numeral 20. The baler is mounted on two wheels 21, carried on an axle 22, and normally additionally supported in operative position by reach members 23 and suspension bar 23a which are adapted to be reversibly secured either to the front or rear of the baler, to the top and bottom frame members 20, and releasably connected at their free ends to any suitable power-driven means, such as a tractor, the engine of which may be employed for drawing the unit and for operating the pick-up conveyer and the baling mechanism.

As here generally shown and more particularly illustrated and described in my said Patent No. 2,336,491, the baling mechanism is driven by a suitable gear mechanism mounted in the gear box 29a to which driving power is imparted by a shaft 29c flexibly connected to a drive shaft 29b which is operatively connected through a universal coupling with a tractor power take-off shaft 59.

The hay or other material is fed to and between the feed roller 118 and drum-roller 31 to the baling belts 80 and 81 by the pick-up conveyer generally designated by numeral 27. The pick-up conveyer is preferably detachable from the baler.

As shown in the drawings, the pick-up conveyer 27 includes a sheet metal trough 310 having preferably a forwardly outwardly flaring shape. The trough 310 is preferably constructed with a slightly depressed substantially rectangular central bottom portion 320a in which the crop-conveying or moving means, preferably in the form of a conveyer web, generally indicated by numeral 311, is movable. The outer side portions 320 of the trough bottom are of triangular shape and are preferably disposed in a slightly higher plane than the central portion as shown in Figs. 2 and 3. The trough sides converge upwardly inwardly toward the baler and increase in height toward their rear ends. The trough sides may be of any suitable light-weight metal construction and, as shown in the drawings, the trough sides each consist of a vertical plate 134 riveted to an upper reenforcing angle iron 135 and to the lower reenforcing angle iron 136. The downwardly bent flanges 137 of the triangular portions 320 may also be riveted to the lower reenforcing angle iron 136.

Although angle irons 139 reenforce the bottom and sides of the trough, the trough possesses the desired flexibility to permit the shoes 321 to ride over uneven ground contours.

The rear or discharge end, of the conveyer trough 310 is supported on extension plates 312 which are bolted to the angles 136 and have hook-like sockets 313 which engage over the bearing portions 313a of the bearings for the drum roller shaft 32.

Any suitable means for locking the upper or rear end of the conveyer trough to the bearings for shaft 32 may be provided. I prefer to use two hook-like locks 314 pivoted at 315 to the extension plates 312, engageable over the bearing portions 313a, and securable as by bolts 138.

The conveyer suspension means includes means for counterbalancing a portion of the weight of the free end of the conveyer and equalizing means whereby both shoes tend to exert about the same amount of pressure on the ground where one shoe may be traversing a ground contour which is relatively different (higher or lower) from the contour of the ground which is being traversed by the other shoe.

The weight of the free forward end of the pick-up conveyer 27 is equalized on the supporting shoes 321 by novel means consisting of a rotatable shaft 140 disposed transversely to and under the conveyer trough 310, and rotatably supported in plates 141 secured to and depending below the sides of the trough 310.

Two spaced arms 142 are secured to and near the ends of the shaft 140. To the free ends of these two arms 142, which are disposed in relatively opposite directions, are pivotally secured the lower ends of the two suspension rods 316. Since I prefer to retain the arms 142 substantially laterally plane aligned, although their free ends are relatively oppositely disposed, their connecting shaft 140 is slightly angularly disposed relatively to the bottom of the trough as illustrated in Fig. 2.

The upper end of each suspension rod 316 is pivotally connected with an arm 143. The arms 143 are rigidly connected to a transverse shaft 144 which is rotatably supported in bearings 145 carried on the forward end of the baler top horizontal frame member 20. One of the arms 143 is connected to one end of a coil spring 146 the other end of which is secured to one end of an adjustable threaded rod 147 supported in one leg of an angle iron 148 fixed to one of the top horizontal members 20. The spring 146 counterbalances the greater portion of the weight of the ground-supported forward end of the conveyer.

For inoperative transportation of the machine on wheels 21, the pick-up conveyer 27 is adapted to be raised from support on the ground by means of a hand lever 149 pivotally supported at 150 to the suspension bar 23a. This hand lever 149 is retained in conveyer-raised position by a dog 151 normally urged by leaf spring 152 for engagement within one of the notches 153 in the quadrant 154 which is secured to the bar 23a and to one of the reach members 23.

The retaining dog 151 is releasable by movement of the hand grip 155 which is pivotally carried at the upper end of the hand lever 149 and connected to the dog 151 by rod 156.

The hand lever 149 is operatively connected with shaft 144 by a lever arm 157 which is rigidly secured to shaft 144 and its free end pivotally connected to the tubular connecting member 158 the forward end of which is preferably adjustably connected with an adjustment rod 159 having one end pivotally connected to the lever arm 149 and its opposite end slidably adjustably carried within the tubular connecting member 158 and adjustably secured therein by a bolt 160 which passes through an opening near the inner end of the rod 159 and any one of several transverse openings 161 in the end of the member 158.

From the preceding description of the pick-up conveyer suspension means it will readily be understood that same functions to counter-balance the conveyer, to lift the latter during inoperative transportation to the site of work, and that when one front side of the trough is lifted relatively higher than the other side, as when one shoe 321 passes over a small mound, the resultant torque imposed upon the shaft 140 through the oppositely disposed arms 142 and their interconnecting suspension means will tend to equalize the resultant stresses on both shoes 321.

The conveyer web, generally designated by numeral 311, consists of a pair of parallel flexible endless belt-like members, preferably chains 308, which are cross-connected by a plurality of substantially equally spaced crop pick-up slats or bars 309 and driven by a pair of sprockets 338 rigidly secured to the conveyer-web drive head shaft 337 journaled in bearings 339 mounted on the head plates 312.

At the lower receiving end of the conveyer trough, the conveyer web 311 is trained about the central portion 327 of the roller 329 which extends across the full width of the flared end of the trough. The outer end portions 319 of the roller 329 are of greater diameter than the central portion 327, extend outwardly beyond the sides of the conveyer web 311, and cooperate functionally with the conveyer web 311 in picking up the crop along the full width of the flared end of the trough as the roller 329 is frictionally driven by the conveyer endless chains 308; such frictional drive permitting the chains 308 to slip about the roller in the event either of the diametrically enlarged end portions 319 should encounter a ground obstruction.

To further facilitate the picking up and impelling of the crop, I provide the pick-up drums 319 with a plurality of circumferentially spaced longitudinally extending ribs or cleats 350 so arranged that one or more of these cleats continuously brush the stubble and assist in impelling the crop over the roller and rearwardly of the conveyer trough.

The crop-collecting or crop-impelling device as illustrated in the drawings and generally designated by numeral 329, includes a medial portion preferably in the form of the tubular feed roller 327 and the hollow pick-up drums 319 which are preferably secured to the outer end portions of the feed roller 327. The drums 319 are secured at their outer ends to the circular portions 330 of the heads 331. The circular portions 330 are disposed within and slightly inwardly of the outer ends of the drums 319 and are provided with integral circular portions 332 of smaller diameter which extend inwardly into the ends of the feed roller 327 for secure connection therewith.

The inner ends 317 of the drums 319 are of decreased diameter and are rigidly fastened to annular fillers 333 which are secured to the feed roller 327.

The conveyer pick-up roller 329 is provided with a pair of stub shafts 318, the inner ends of which are rigidly secured to and within the drum heads 331, their outer ends being rotatably carried in elongated tubular bearings 334, preferably closed at their outer ends. The outer end portions of these bearings 334 are adjustably supported in the elongated openings 335 of the conveyer shoe-supporting plates 336 which are fastened to the conveyer trough sides.

Means for adjustably retaining the bearings 334 in operative position whereby the conveyer chains 308 are adapted to be tightened or loosened consists in a pair of threaded rods 162 formed integrally with the arcuate shields 168 as by being welded to the shield extensions 169, the latter having circular openings in which the bearings 234 fit and are secured, and the rods 162 being adjustably positioned in openings in the transverse angle iron 166. The rods 162 may be secured in adjusted position to the depending leg of the angle iron 166 by nuts 163, or the rods may be provided with a plurality of longitudinally aligned transverse holes adapted to receive retaining cotter pins.

It will now be readily understood that the conveyer pick-up roller 329 is adjustably rotatably supported on the stub shafts 318 and bearings 334; that it is preferably frictionally driven by the conveyer-web chains 308, although sprockets driven by the chains 308 could be secured to the feed roller 327; that the feed roller 327 cooperates with the pick-up slats 309 in assisting to move the crop over the feed roller 327 onto the conveyer web 311 and trough 310 for further continuous movement by such slats to the machine to which the pick-up conveyer is attached; and that in such feeding of the crop onto the conveyer, the feed roller 327 will be assisted in its feeding function by the enlarged drum ends 319 which are disposed in horizontal alignment with the trough flared ends 320 and which drums have a slightly increased peripheral speed over that of the feed roller 327 to thereby facilitate the feeding of the crop onto the flared ends of the trough.

To further facilitate the pick-up of the crop,

I provide the pick-up drums 319 with a plurality of circumferentially spaced longitudinally extending ribs or cleats 350, preferably in spiral arrangement thereon, that is, such ribs or cleats 350 being preferably angularly disposed relatively to the axis of the feed roller 327 and preferably grouped relatively oppositely on the two pick-up drums thereby having a continuous progressively sweeping contact with the stubble and tending to move or impel the crop onto the trough flared ends in directions converging toward the center of the pick-up conveyer to facilitate the movement of the crop onto the trough and conveyer web.

Although the pick-up conveyer 27 might be arranged to be supported on a pair of ground-traversing wheels or rollers, I prefer to provide therefor a pair of slidable shoes 321 each consisting of a bent plate having a lateral portion 321a and a forwardly relatively angularly slightly upwardly disposed portion 321b terminating in upwardly and rearwardly angularly bent portion 321c which is secured, by rivets or otherwise, to the inclined angle iron fender 323 which is adjustably secured, as by bolts 164, to the plate 336, the plate 336 being provided with a plurality of openings 165 for such adjustable securement of the fender 323.

Each shoe 321 is reenforced with a plate 167 which is riveted to the fender 323 and has a rearwardly extending portion suitably connected, as by welding or otherwise, to the lateral portion 321a of the shoe. I prefer to form the shoe portions 321a and 321b with upstanding outer side and rear flanges 321d. As shown more clearly in Fig. 4, the lower end of the lateral leg of the angle iron fender 323 is preferably cut angularly, as at 321e, to provide a downwardly forwardly converging nose-like end portion which cooperates with the inwardly angularly disposed face of portion 321c to deflect the crop toward the pick-up drum 319.

The arcuate shields 168, integral with and disposed at right angles to the extensions 169, integral with the shields and the rods 162, and located at the outer end of each drum and extending inwardly of such outer end, serve to prevent part of the crop from working up into the outer end portions of the drums 319 and clogging therein around the bearings 334. The bearings 334 are slidably adjustably supported in the elongated openings 335 of the plates 336 and adjustably retained therein by the extension adjustment rods 162 which are formed integrally with the extensions 169 or welded thereto.

The conveyer web pick-up members or bars 309 may be made of any suitable cross-section. Desirable features of these improved spaced pick-up members 309 consist in the provision of a plurality of upstanding prongs or projections spaced longitudinally of and upon the upper edge of the leading upstanding side of each of such members; the pointed angular shape and the preferable thin cross-section of each of such prongs; and the substantially perpendicular positions maintained by the leading faces of the pick-up members and their spaced upstanding prongs relatively to and during their movement on the upper face of the trough bottom.

One type of pick-up member 309 is illustrated more clearly in Figs. 4 and 6. It consists of a bar of inverted channel cross-section having a plurality of upstanding pointed projections 309a disposed above the horizontal web portion 309b welded thereto and in face alignment with the leading face 309c of the leading flange of the channel member 309. The spaced flanges of the channel members 309 insure the maintenance of their leading faces 309c and those of their upstanding projections 309a perpendicularly to the face of the trough bottom portion 320a.

The channel members 309 and their upstanding spaced prongs 309a are preferably formed from comparatively thin flat sheet metal and the prongs 309a are cut with sides converging upwardly preferably to a point as shown in Figs. 2, 4 and 7.

The ends of the pick-up members 309 are riveted to the link connections 170 of the chains 308 which preferably are adapted to slide over wooden rails 171.

It is obvious that the transverse pick-up members 309 as illustrated in Figs. 4 and 6 could readily be constructed of a bar of L-shaped cross-section instead of channel cross-section but such construction involving the elimination of the rear or following flange 309d from the present channel construction would not as satisfactorily insure the desired perpendicular stability of such pick-up members, relatively to the plane of the traversed trough bottom 320a, during their movement thereon, hence, another desirable type of pick-up member 309 may be constructed of L-shape cross-section from comparatively thin sheet metal, as illustrated in Figs. 12, 13 and 14, comprising a horizontal leg 309e and a vertical leg 309f provided with a plurality of upstanding pointed flat-sided prongs 309a spaced longitudinally on the upper edge of and integrally connected with the upstanding leg 309f, the side edges 309g of the prongs 309a converging upwardly preferably to a point as those in the pick-up member illustrated in Figs. 4, 6 and 7. The horizontal leg 309e may be bent angularly upwardly and outwardly at its ends, as at 309h, and riveted to suitable link connections 308a of the chains 308.

One end of the conveyer web drive shaft 337 extends beyond one of the bearings 339 to receive thereon an arm 340 and a drive gear 343 which is rigidly secured to the shaft 337.

The arm 340 is loosely mounted on the shaft 337 between the bearing 339 and the conveyer web drive gear 343 and swingably carries at its one end an intermediate gear 341 which is adapted to be swung by the arm 340 into operative engagement with or disengagement from the drive gear 222 which is keyed to shaft 32. The intermediate gear 341 is however constantly operatively in mesh with the conveyer web drive gear 343.

The gears 341 and 343 are interchangeable, one of such gears may be slightly larger in diameter than the other so that the relative speed of the conveyer web 311 may, by the interchange of such gears, be increased or decreased as may be found desirable.

The intermediate gear 341 is shown in Fig. 9 in mesh with drive gear 222 in conveyer-driving position. When the arm 340 is swung downwardly to disengage the intermediate gear 341 from gear 222, as shown in Fig. 10, the movement of the conveyer web 311 is stopped. The intermediate gear 341 is normally pulled and held in mesh with the driving gear 222 by a coiled spring 342 one end of which is attached to the arm 340 and the other to the conveyer head plate 312 at 345.

The disengagement of gear 341 from gear 222 to stop the feeding of the material to the machine may be effected automatically by the machine or manually.

To stop the feeding movement of the conveyer web 311 manually, I provide one or more hand levers 346, preferably one on each side of the pick-up conveyer, and secured to a transverse rod 347 rotatably carried in the head plates 312. Projecting outwardly from one side of one of the hand levers 346 is a stud 344 carrying a small roller 328 which operates in a cam-shaped opening 348 in a wing 349 formed integrally with the arm 340. The roller 328 is so positioned in and relatively to the cam-shaped opening 348 that when either one of the levers 346 is swung forwardly, as shown in Fig. 10, the intermediate gear 341 is forced out of operative engagement with the driving gear 222 to thus stop the movement of the conveyer web 311.

The automatic operation of the baler shown generally in the attached drawings for illustrative purposes is described in my above-referred-to Patent No. 2,336,491, issued December 14, 1943, and in Patent No. 2,096,990 issued to me on October 26, 1937.

The pick-up conveyer drive mechanism and the automatically operable means for stopping and starting the pick-up conveyer material-feeding web 311 illustrated in Figs. 9, 10 and 11 includes means for automatically disengaging the intermediate drive gear 341 from the baler power-driven drive gear 222 in response to the movement of an automatically movable member, as for example the slidable bar 218, which is automatically movable by means on the machine or baler, and such automatic conveyer web stopping and starting means includes automatically operable means for delaying the automatic starting of the conveyer web into material-feeding operation, such delay in starting the feed of the material to the machine being necessary in machines where time is required to complete certain operations which take place in the machine during the time the pick-up conveyer web is inoperative, such as the complete ejection of the bale from the machine and return of the baling mechanism to its initial position before a succeeding strip of material is fed to the baling mechanism.

The above automatic operations are attained by means which, as preferably illustrated in Figs. 9, 10 and 11, consist in an automatically movable conveyer drive-gear throw-out member 226 in the form of a bar pivotally mounted, as at 227, on a stationary part 20 of the baler structure and adapted by means of its curved end to swing downwardly into engagement with the adjustable bolt 229 carried on arm 340 to thereby move it with the gear 341 out of mesh with gear 222 to stop the conveyer web 311.

As above stated, the conveyer drive-gear throw-out member 226 is movable to stop the movement of the conveyer web 311 automatically by movable means on the baler, and in the present instance such means consists of the slidably mounted trip bar 218 having a contact lug member 224 riveted to one face thereof which is adapted to contact a pin 225 projecting from one side of the conveyer drive-gear throw-out member 226 to thereby cause its downward swinging movement into conveyer-arresting position.

Under any automatic operation where a time-delayed starting operation of the conveyer would not be desirable, the conveyer web 311 would be automatically set in motion promptly upon the upward return movement of the trip bar 218 whereupon the lug 224 would be released from its hold upon the pin 225 to thereby permit the spring 342 to raise the intermediate gear supporting arm 340 together with the throw-out member 226 into operative position with the intermediate gear 341 in engagement with the driving gear 222, however, where it is desirable to provide a delayed return movement of the arm 340 and gear 341 into operative position, as in the present illustrative baler application, even though the trip bar 218 is moved upward into released position, I provide automatically operable means for delaying the operative engagement of the intermediate gear 341 with the power-driven driving gear 222 which consists in the provision a retaining arm 326 pivotally mounted on pin 325 carried in bracket 324 which is secured to the inner face of the curved end portion 228 of the throw-out member 226. The upper edge 172 of the retaining arm 326 is preferably of arcuate shape and its lower edge is provided with a flattened portion 327 adapted to engage the base of the bracket 324 to thereby limit the downward swing or tilt of such arm 326. The retaining arm 326 is loosely mounted on its pivot pin 325 and due to its offset mounting on its pivot pin 325 tends normally to tilt downwardly into retaining position shown in Fig. 10.

When the conveyer web 311 is driven by the intermeshed gears 222, 341 and 343, the retaining arm 326 rests against the side of the shaft 32 as shown in Fig. 9. When however the conveyer drive mechanism is moved into inoperative position as shown in Fig. 10, the retaining arm 326 is automatically moved by gravity into retaining position with its lower edge 327 in arrested engagement with the laterally disposed leg of its supporting bracket 324 and its upper arcuate edge 172 disposed slightly beneath the shaft 32 and an upward movement of the trip bar 218 into release position will not permit the spring 342 to promptly respond to such release movement to move the arm 340 with gear 341 into immediate operative engagement with the driving gear 222 because, upon such upward release movement of the trip bar 218, the throw-out member 226 will be caused to make only a very slight upward movement by the spring-actuated arm 340 until the arcuate edge 172 of the retaining arm 326 moves upwardly the distance of the very slight clearance between it and the shaft 32 into engagement with the shaft 32 which is constantly rotating during all operations of the baler.

With the edge 172 of the retaining arm disposed below or in engagement with shaft 32, the arm 340 is prevented from moving the intermediate gear 341 into operative engagement with the driving gear 222 and therefore the conveyer web is maintained in stationary inoperative position, however, when the throw-out member 226 is released by the trip bar 218 and moves its retaining arm 326 into engagement with the rotating shaft 32, the friction between the clockwise rotating shaft 32 and the arcuate edge 172 will cause the retaining arm 326 to be gradually tilted upwardly about its pivot pin 325, while it is maintained pressed against shaft 32 by the spring-actuated arm 340, until the edge 172 is rolled by the shaft 32 to the point where the retaining arm 326 is released from the rolling contact with shaft 32 and permitted to slide along shaft 32 upwardly to a position at rest against the side of the shaft 32 thus fully releasing the throw-out member 226 for free upward movement by the spring-pressed arm 340 and thereby operatively reengaging the intermediate gear 341 with the power-driven gear 222 whereat the conveyer drive mechanism will be in operative position as shown in Fig. 10 to drive the conveyer web 311.

It will now be readily apparent that the conveyer web 311 is adapted to be maintained at rest for a period of time during the operation of other mechanisms of the baler, and that the conveyer web is again placed in operation through engagement of the intermediate gear 341 with the power driven gear 222, which operation is effected after a time delay controlled by the delayed or retarded movement of the gradually tiltable retaining arm 326.

When the conveyer web drive mechanism has been restored to its conveyer-web-driving position, as shown in Fig. 10, the tractor may then be set into propelling motion to pull the baler while the pick-up conveyer picks up the hay or other crop and feeds it to the baler or other machine to which the pick-up conveyer is attached.

It is now evident that the pick-up conveyer head shaft 337 is adapted to be intermittently driven by the continuously rotating baler drum shaft 32 through the power-driven gear 222, the intermediate gear 341 and the conveyer head shaft drive gear 343. The shaft 32 and the gear 222 operatively connected thereto are driven by a chain 35 which is trained about the sprocket 34 secured to shaft 32 and sprocket 36 which is secured to the roller shaft 29. One end of the roller shaft 29 extends into the gear box 29a for operative connection therein to the bevel gear 26 which is driven by the bevel gear 25 mounted on and driven by the drive shaft 29c.

While I have illustrated and described herein preferred structures and arrangements in which the principles of the present invention have been embodied, it is to be understood that my invention is not to be construed as being limited to the specific details shown and described herein for various modifications within the scope of the appended claims may occur to those skilled in the art to which this invention appertains.

I claim and desire to secure by Letters Patent:

1. In a crop harvesting machine adapted to be moved over a field and having a power-driven drive shaft, a pick-up conveyer disposed forwardly of and movable with said machine, said conveyer including a forwardly flared trough, crop-conveying movable means adapted to move the crop on said trough and feed same to the machine, mechanism actuated by said drive shaft for propelling said movable means, and a rotatable elongated pick-up member at the flared crop-receiving end of said trough adapted to be rotated by said crop-conveying movable means and having end portions enlarged relatively transversely to the central portion thereof which interconnects said enlarged end portions, said enlarged end portions being disposed at and parallel to the flared ends of the trough which extend laterally beyond the sides of said movable means.

2. In a crop harvesting machine as set forth in claim 1, including said rotatable pick-up member enlarged end portions each consisting of a cylindrical portion axially aligned with said central portion, and a plurality of circumferentially spaced longitudinally extending ribs on the exterior face of each of said cylindrical end portions.

3. In a crop harvesting machine as set forth in claim 1, including said rotatable pick-up member enlarged end portions consisting of cylindrical portions each having a plurality of circumferentially spaced longitudinally spirally extending ribs on the exterior face thereof, the said ribs on one of said enlarged portions being disposed relatively oppositely to the ribs on the other one of said enlarged portions to thereby tend to move the crop onto the flared lateral extensions of the trough in directions converging inwardly toward the center of the trough.

4. A pick-up conveyer for a crop-harvesting machine comprising a forwardly flared trough, an endless crop-conveying web of less width than the flared end of said trough adapted to pick up and convey the crop on said trough to the machine, a head shaft for propelling said crop-conveying web, a pick-up roller rotatably supported at the flared end of said trough and rotated by said crop-conveying web, said pick-up roller comprising a central elongated cylindrical portion provided with cylindrical end portions axially aligned with and of greater diameter than said central portion, said end portions being disposed at and parallel with the flared end portions of the trough which extend laterally beyond the sides of said crop-conveying web, means for imparting rotation to said head shaft, and means for supporting the forward end of the trough on the ground during the forward movement of the pick-up conveyer.

5. A pick-up conveyer as set forth in claim 4 and wherein said endless crop-conveying web includes a pair of spaced endless chains transversely connected together by a plurality of bars spaced apart longitudinally of said crop-conveying web, each of said bars having a plurality of upstanding pointed prongs of comparatively thin flat material projecting above the top of the bar and spaced longitudinally of the bar.

6. A pick-up conveyer as set forth in claim 4 and wherein said endless crop-conveying web includes a pair of spaced endless chains transversely connected together by a plurality of bars of inverted channel cross-section spaced apart longitudinally of said crop-conveying web, each of said bars having a plurality of spaced upstanding triangular prongs of comparatively thin flat material, the side edges of each prong converging upwardly to a point disposed above the top face of the web of the bar, said prongs on each bar being disposed with the leading flat faces thereof in substantially vertical alignment with the outer face of the leading flange of the channel bar.

7. In a crop harvesting machine as set forth in claim 4 and wherein said endless crop-conveying web consists of a pair of spaced endless chains transversely connected together by a plurality of bars spaced apart longitudinally of said crop-conveying web, each of said bars having a plurality of spaced upstanding pointed prongs of comparatively thin flat material projecting above the top of the bar, and wherein each of said enlarged end portions of said pick-up roller is provided with a plurality of circumferentially spaced ribs disposed longitudinally of and slightly spirally on the exterior face thereof, the said ribs on one of said enlarged portions being disposed relatively oppositely to the ribs on the other one of said enlarged portions to thereby tend to move the crop onto the flared lateral extensions of said trough in directions converging inwardly toward the center of the crop-conveying web.

8. In combination, a conveyer trough, a crop pick-up conveyer adapted to pick up the crop and move the crop onto and on said trough from the receiving end thereof to the discharge end thereof, said conveyer including a pair of laterally spaced endless chains having upper runs movable on said trough, and a plurality of crop pick-up bars disposed transversely to said chains, connected at their ends to said chains, and spaced longitudinally of the conveyer, each of said pick-up bars comprising an elongated member having a lateral portion, slidably movable on the conveyer trough, and an upstanding portion disposed relatively angularly to said lateral portion provided with a plurality of upstanding prongs spaced longitudinally of and projecting above said upstanding portion, each prong having opposed flat sides and the edges thereof converging upwardly to a point, said flat prong sides of each bar being aligned in a common plane parallel to said upstanding portion of the bar and said pick-up bars being movable on said trough with said aligned flat sides disposed perpendicularly to the direction of movement of said bars on said trough.

9. A crop pick-up attachment for a harvesting implement including a forwardly flared trough, a crop pick-up conveyer adapted to pick up the crop from the ground and move the crop onto and on said trough from the forward receiving end thereof to the rear discharge end thereof, said conveyer including a pair of laterally spaced endless chains having upper strands movable on said trough, a plurality of spaced bars disposed transversely to and connecting said chains, each of said bars having a plurality of spaced upstanding prongs having flat opposed sides and upwardly converging edges, said flared trough having a central substantially rectangular bottom portion in which the upper strand of said conveyer is movable, said central rectangular trough bottom portion being of a width substantially equal to the width of the discharge end of the trough but of less width than the flared receiving end of the trough, the laterally flared side portions of the trough bottom which extend laterally outwardly beyond said central rectangular bottom portion being each substantially of triangular shape and disposed in a lateral plane which is higher than the lateral plane of said central rectangular bottom portion and having upstanding sides converging rearwardly toward the rear or discharge end of said central rectangular bottom portion, a cylindrical pick-up roller rotatably supported at the flared crop-receiving end of said trough, rotated by said conveyor chains, and having an elongated pick-up drum secured to and carried at each end thereon, each drum being of a diameter greater than said roller and of a length substantially equal to the width of the flared elevated trough end portion, each of said drums being provided with a plurality of circumferentially spaced ribs disposed longitudinally of and spirally on the exterior face thereof, said ribs on one of said drums being disposed relatively oppositely to the ribs on the other one of said drums to thereby tend to move the crop onto the flared elevated side portions of the trough in directions converging toward the center of the conveyer.

10. A crop pick-up attachment for a harvesting implement as set forth in claim 9 wherein said pick-up drums consist of hollow cylinders having inner end portions of slightly decreased diameter adapted to be frictionally engaged by said conveyer chains to cause said pick-up roller to rotate, said pick-up roller extending into said pick-up drums and being secured to said inner end portions of said drums and rigidly connected with the outer end portions of said drums by circular disk members secured to the inner faces of the cylindrical drum walls, said disk members being provided with integral extensions extending into and securely connected with the ends of the pick-up roller, stub shafts securely connected with said circular disk members and extending outwardly of said drums, bearings for adjustably supporting said stub shafts on the flared end of the trough, and a pair of shoes adjustably carried at the receiving ends of the trough sides, said shoes being tapered forwardly and their upper faces being inclined angularly upwardly over the outer end portions of said pick-up drums.

11. A pick-up conveyer for a crop-harvesting machine comprising a forwardly flared trough, an endless crop-conveying web of less width than the flared end of said trough adapted to convey the crop along said trough to the machine, a head shaft for propelling said crop-conveying web, an elongated pick-up member rotatably supported at the flared end of said trough, means for imparting rotation to said head shaft and to said rotatable pick-up member, said pick-up member comprising a central portion and end portions of greater radial dimension than said central portion, said end portions of said pick-up member having means operative to move the crop rearwardly and with a laterally inward component to said crop-conveying web, and said end portions being disposed at and parallel with the flared end portions of the trough which extend laterally beyond the sides of said crop-conveying web.

12. In a crop harvesting machine adapted to be moved over a field, a pick-up conveyer disposed forwardly of and movable with said machine, said conveyer including a forwardly flared trough, crop-conveying means adapted to move the crop along said trough and feed same to the machine, mechanism for propelling said crop-conveying means, and an elongated rotatable member disposed at and extending across substantially the full width of the wide front end of said trough and having at the ends thereof axially aligned and diametrically enlarged portions extending outwardly beyond the sides of said crop-conveying means, said diametrically enlarged portions of said rotatable member having impelling means cooperating with said crop-conveying means to move and impel the crop upwardly and rearwardly over said rotatable member onto said trough for movement by said crop-conveying means to said machine.

13. In a crop harvesting machine as set forth in claim 12 and wherein said impelling means comprises a plurality of circumferentially spaced longitudinally extending spirally disposed ribs on each of said enlarged portions, the ribs on one of said enlarged portions being disposed relatively oppositely to the spiral ribs on the other of said enlarged portions.

14. In a crop harvesting machine as set forth in claim 12 and wherein said impelling means comprises a plurality of circumferentially spaced ribs extending longitudinally of said diametrically enlarged portions.

15. A pick-up conveyer adapted to be moved over a field including an inclined forwardly flared trough, an endless traveling web having its upper run supported and movable on said trough, a single roller disposed transversely of, adjacent to, and across the full width of the flared end of said trough, the forward end of said endless web being trained about the medial portion of said roller and the outer end portions of said roller extending outwardly beyond the sides of said endless web in the form of extensions which are diametrically enlarged relatively to said medial portion to facilitate and impel, during the forward movement of said trough and in cooperation with said endless web, the upward and rearward movement of the crop over said roller onto the conveyer trough for movement thereon by the upper run of said endless web, and rotatable driving means for moving said endless web.

16. A pick-up conveyer as set forth in claim 15 wherein said means for driving said endless web includes a driven shaft at the upper rear end of said web, and wherein said endless web is trained about said roller to frictionally rotate said roller when said driving means is rotated.

17. In a crop harvesting machine adapted to be moved over a field and having a driven shaft, a pick-up conveyer disposed forwardly of and movable with said machine, said conveyer including a trough, crop-moving means adapted to move the crop along said trough and feed same to the machine, mechanism actuated by said driven shaft for propelling said crop-moving means, a crop-impelling device at the forward end of said trough for feeding the crop to said crop-moving means, said crop-impelling device extending across substantially the full width of the forward end of said trough and including end portions operative to move the crop rearwardly and with a laterally inward component to said crop-moving means.

18. In a crop harvesting machine adapted to be moved over a field, a conveyer disposed forwardly of and movable with said machine, said conveyer including a trough, crop-moving means adapted to move the crop along said trough and feed same to the machine, driven mechanism carried on said trough for propelling said crop-moving means, a crop-impelling device disposed at and parallel to the forward end of said trough and comprising a rotatable instrumentality having a medial portion disposed within substantially the outer limits of the transverse width of and operatively associated with said crop-moving means and including rotatable cylindrical means disposed at opposite ends of said medial portion and having on the peripheries thereof crop-impelling means operative, in cooperation with said crop-moving means, to move the crop upwardly and rearwardly onto the trough for movement thereon by said crop-moving means, the lineal speeds of the peripheries of said cylindrical means being greater than the speed of said crop-moving means.

UMMO F. LUEBBEN.